May 20, 1969   L. D. GRIDER ET AL   3,445,004
TELESCOPIC CANTILEVERED BOOM
Filed Feb. 1, 1967
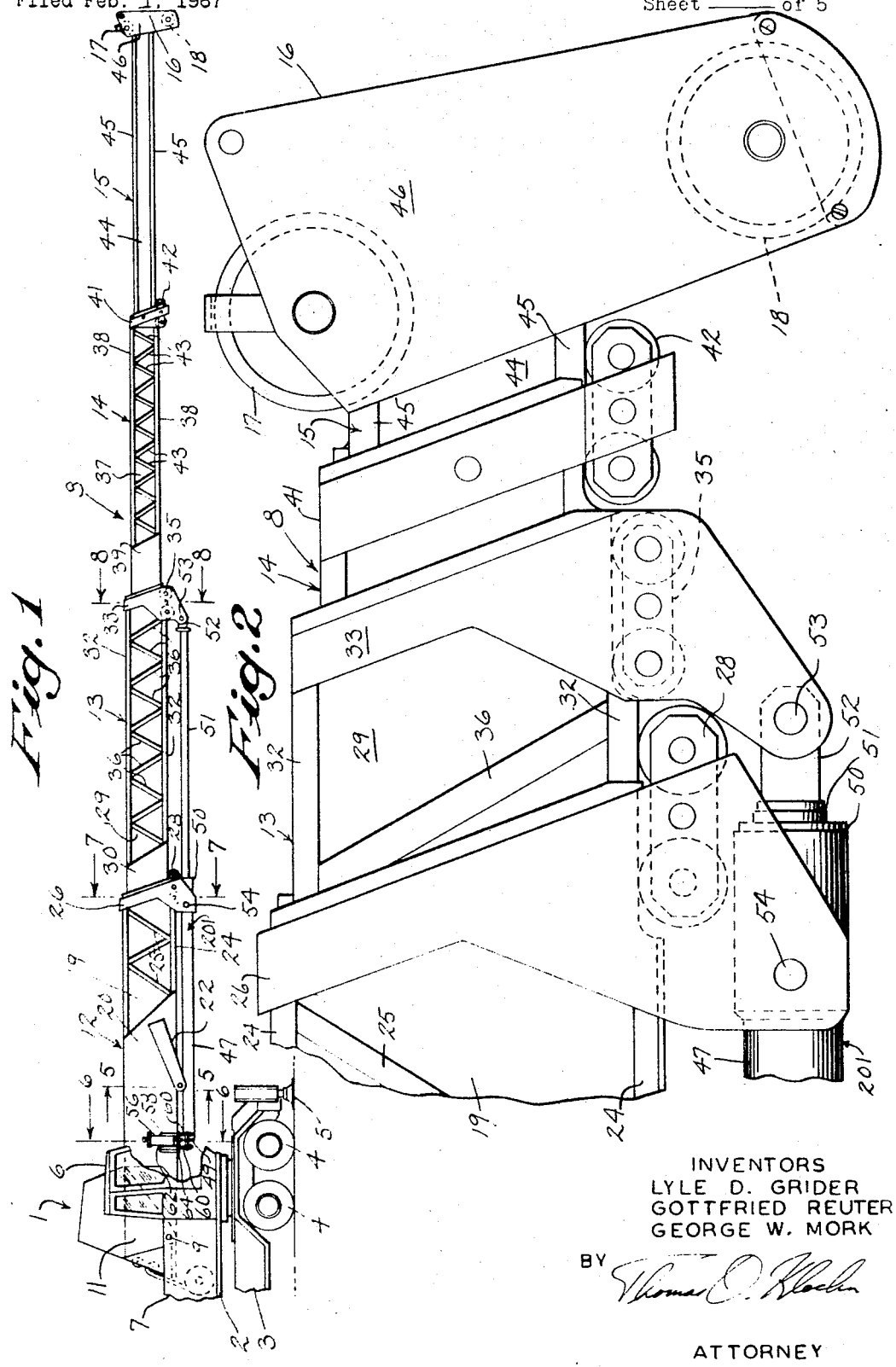
INVENTORS
LYLE D. GRIDER
GOTTFRIED REUTER
GEORGE W. MORK
BY 
ATTORNEY May 20, 1969 L. D. GRIDER ET AL 3,445,004
TELESCOPIC CANTILEVERED BOOM
Filed Feb. 1, 1967 Sheet 2 of 5
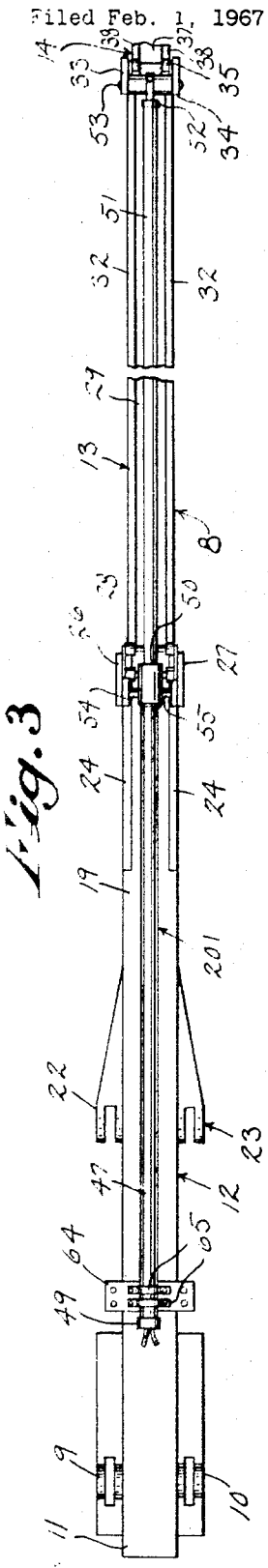
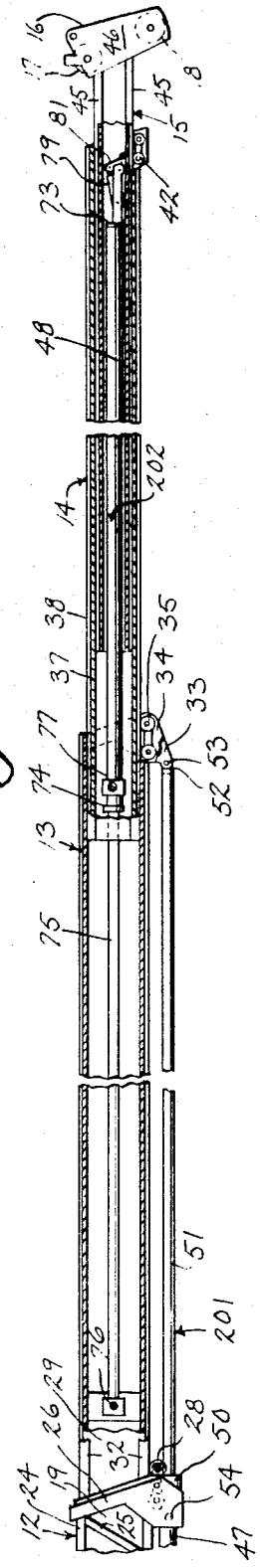
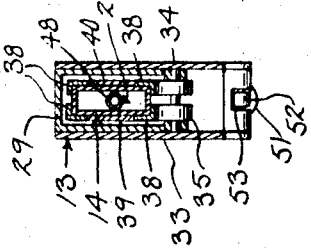
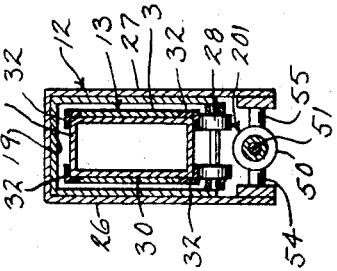
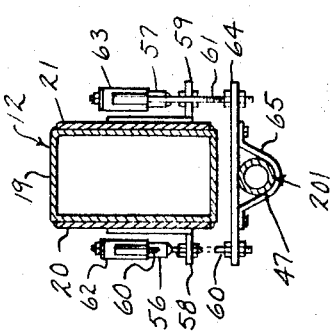
INVENTORS
LYLE D. GRIDER
GOTTFRIED REUTER
GEORGE W. MORK
BY
ATTORNEY

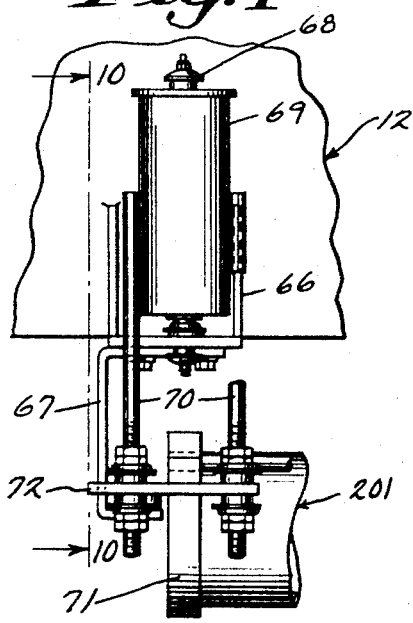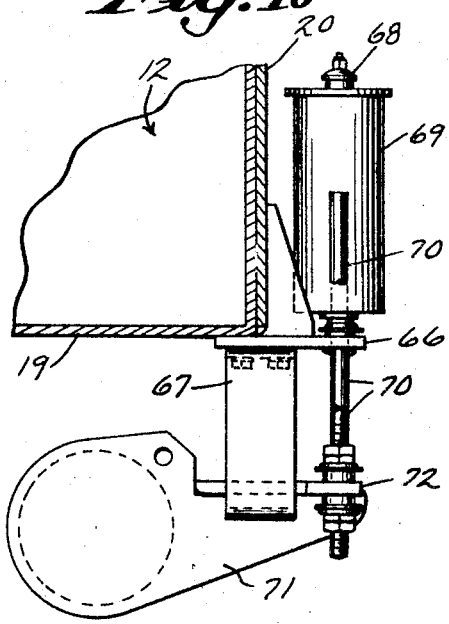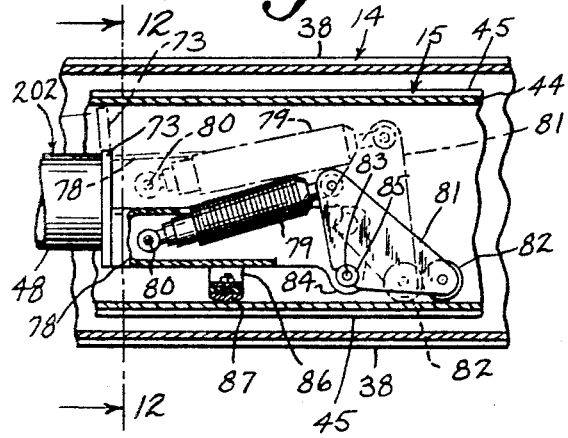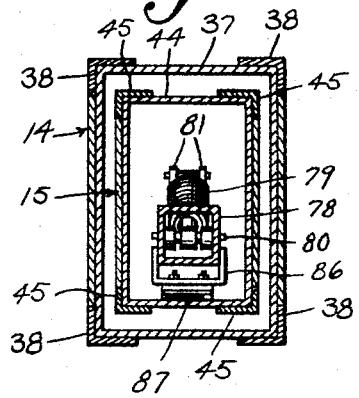

May 20, 1969   L. D. GRIDER ET AL   3,445,004
TELESCOPIC CANTILEVERED BOOM
Filed Feb. 1, 1967   Sheet 4 of 5
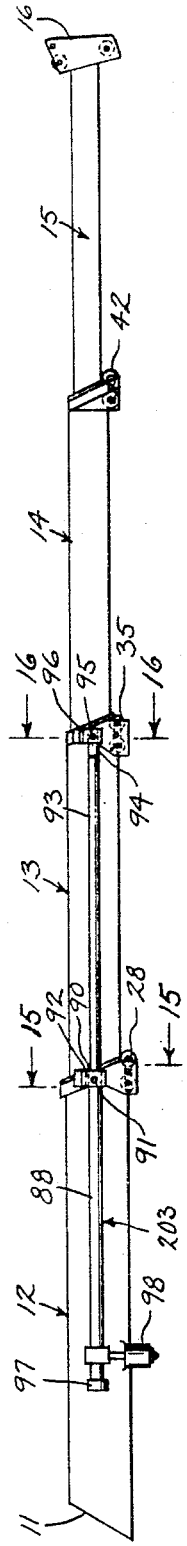
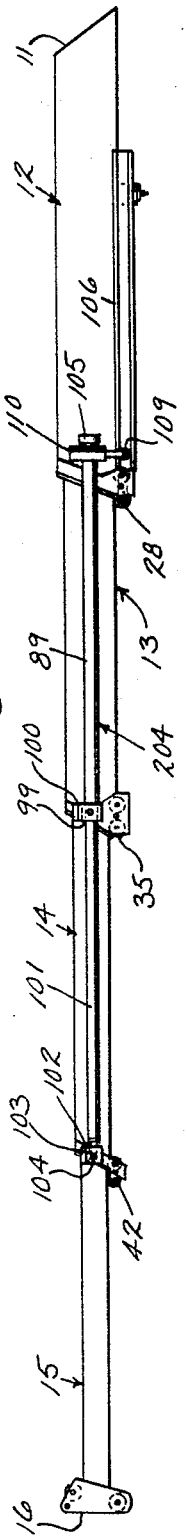
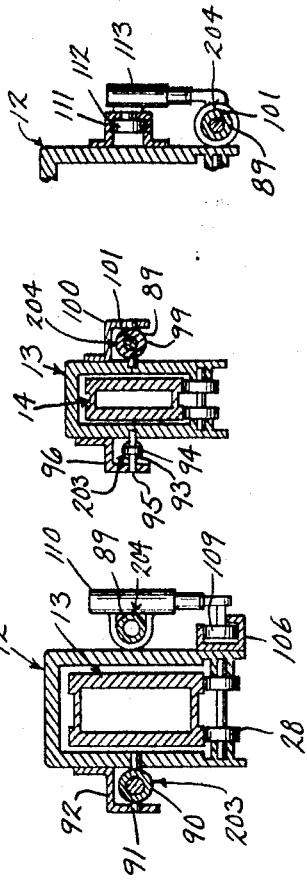
INVENTORS
LYLE D. GRIDER
GOTTFRIED REUTER
GEORGE W. MORK
BY Thomas O. Kloehn
ATTORNEY

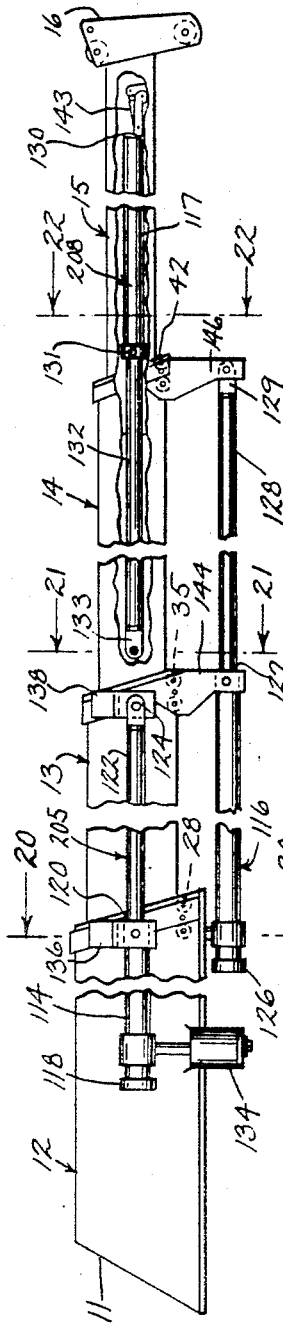

United States Patent Office 3,445,004
Patented May 20, 1969

3,445,004
TELESCOPIC CANTILEVERED BOOM
Lyle D. Grider, New Berlin, and Gottfried Reuter and George W. Mork, South Milwaukee, Wis., assignors to Bucyrus-Erie Company, South Milwaukee, Wis., a corporation of Delaware
Filed Feb. 1, 1967, Ser. No. 618,254
Int. Cl. B66c 23/06, 23/62
U.S. Cl. 212—55                    10 Claims

ABSTRACT OF THE DISCLOSURE

After discussing loading problems of hydraulic cranes of cantilevered, telescopic booms, a boom structure is disclosed employing a rectangular steel tube with an external supporting skeleton. Hydraulic cylinders are disclosed for extending and contracting the boom, and these are mounted with the piston rods fastened to one boom section, the rod ends of the cylinders trunnion mounted to one boom section, and the blind ends of the cylinders suspended on the boom by springs with shock absorbers.

Background of the invention

The present invention relates to telescopic crane booms that are cantilever mounted, as distinguished from the type of crane boom that is supported at its top end by suspension cables as well as being supported at its foot end. The cantilevered boom has unique problems, which result from the shear and bending stresses exerted on it by both the weight of the boom and the payload, and which therefore are not presented by the other type of crane boom. It is the essential problem of telescopic cantilevered crane booms to maximize payload and to minimize boom deflection.

The prior art has sought to do this by strengthening the boom with increasing weight of materials, but the added weight increases the bending and shear stresses, proportionately reducing the payload. The prior art also ends mounts an hyraulic operating cyliners on top of the boom to avoid a swinging load when the boom is at a high angle, but, as will be shown, this too adds to the weight and deflecting forces acting on the boom.

Summary of the invention

The present invention may be summarized as a telescopic cantilevered boom for an hydraulic crane having a plurality of sections in telescoping relationship, at least one of said sections beig made up of a metal tube with an external supporting skeleton. The present invention also resides in a telescopic cantilevered boom made up of a plurality of sections in telescoping relationship, that are telescoped by hydraulic linear motors; and at least one of those linear motors has its piston rod fastened to one of said boom sections, the rod end of its cylinder pivotally fastened to an adjacent boom section and the blind end of its cylinder resiliently supported by said boom.

It is the principal object of the present invention to minimize the deflection and maximize the payload capacity of a telescopic cantilevered boom. This object is achieved by providing a boom structure that is both lighter in weight and stronger than comparable booms previously used. Also, the invention makes is possible to reduce, often by as much as 50%, the weight of the hydraulic linear motors used to telescope the boom. Equally important, one aspect of the invention teaches a mounting of at least one hydraulic linear motor such that it will bear a portion of the stress so as to increase the payload capacity by a corresponding amount. Then, too, the mounting of the hydraulic linear motors are such as will isolate the vulnerable parts of the linear motors from the deflection which inevitably does occur.

In the attached drawings, which form a part of the description of this invention, and in the description which follows, there are disclosed several embodiments of the present invention which compose the best mode presently contemplated by the inventors for carrying out their invention. The invention is described in such full, clear, concise and exact terms as to enable any person skilled in the art to which it pertains, or with which it is most nearly connected to make and use the same. However, the embodiments described and disclosed here in detail are not to be considered the invention itself. The subject matter which the inventors do regard as their invention is particularly pointed out and distinctly claimed in the claims at the conclusions of this specification.

Brief description of the drawings

FIG. 1 is a side elevation of a crane embodying the present invention.

FIG. 2 is a side elevation of a portion of the boom shown in FIG. 1 in its retracted position.

FIG. 3 is a bottom view of the boom shown in FIG. 1.

FIG. 4 is a side elevation in section of a portion of the boom shown in FIG. 1.

FIG. 5 is a rear elevation in section taken along the line 5—5 in FIG. 1.

FIG. 6 is a front elevation in section taken along the line 6—6 in FIG. 1.

FIG. 7 is a front elevation in section taken along the line 7—7 in FIG. 1.

FIG. 8 is a front elevation in section of the boom shown in FIG. 1 along the line 8—8 in Fig. 1.

FIG. 9 is an enlarged partial side elevation of the boom shown in FIG. 1 showing an alternative to the cylinder mounting of FIGS. 1 and 6.

FIG. 10 is an enlarged partial rear elevation in section of the cylinder mounting shown in FIG. 9 illustrating the resilient mounting of the blind end of the cylinder outside of the boom.

FIG. 11 is an enlarged side elevation in section of a portion of the side elevation in section in FIG. 4.

FIG. 12 is an enlarged rear elevation of the boom shown in FIG. 4 taken along the line 12—12 in FIG. 11.

FIG. 13 is a side elevation of a second embodiment of the boom shown in FIG. 1.

FIG. 14 is a side elevation of the boom in FIG. 13 from the opposite side of that shown in FIG. 13.

FIG. 15 is a front elevation in section of the embodiment shown in FIGS. 13 and 14 taken along the line 15—15 in FIG. 13.

FIG. 16 is a front elevation in section of the embodiment shown in FIGS. 13 and 14 taken along the line 16—16 in FIG. 13.

FIG. 17 is a partial sectional view of an alternative to FIG. 15.

FIG. 18 is a side elevation partially in section of a third embodiment of the present invention.

FIG. 19 is a bottom plan view of the embodiment shown in FIG. 18.

FIG. 20 is a front elevation in section taken along the line 20—20 in FIG. 18.

FIG. 21 is a front elevation in section taken along the line 21—21 in FIG. 18.

FIG. 22 is a front elevation section taken along the line 22—22 in FIG. 18.

Description of the preferred embodiments

In FIG. 1 a crane embodying the present invention, disclosing only the crane structure which is related to, or environment of, the present invention, is shown. Such things as the hoist cables and related mechanism, which are well known to the art, have been omitted from the drawings to achieve greater clarity in the exposition of the invention. However, for the purposes of this description it may be understood that all of the conventional operating structures and mechanisms not shown in the drawings would be present.

The crane 1 has for its principal supporting structure a revolving frame 2 which is rotatably mounted on a truck chassis 3, only the rear end of which is shown in the drawing. The truck chassis 3 is mounted on truck wheels 4 and it has hydraulic outriggers 5 which are lowerable to stabilize it when the crane 1 is in operation. On top of the revolving frame 2 is a crane cab 6 with an equipment housing 7 to the rear of it. In referring to the truck chassis 3, the terms "front" and "back" are used in the conventional sense, but in referring to the crane 1, the word "front" refers to the direction in which the crane cab 6 faces, whether that be to the front or to the rear of the truck chassis 3, and the word "back," of course, means the opposite.

The crane 1 has a boom 8, which is pivotally cantilevered from main boom supports 9 and 10 on either side of the foot 11 of the boom 8. The boom 8 is a telescopic boom made up of a foot section 12, a first intermediate section 13 that telescopes into the foot section 12, a second intermediate section 14 that telescopes into the first intermediate section 13, and a top section 15 that telescopes into the second intermediate section 14. At the top 16 of the top section 15, and therefore of the boom 8, a pair of hoist sheaves 17 and 18 are mounted to support and guide a hoist cable (not shown).

One aspect of the present invention is the structure of the boom 8. The foot section 12 has as its main piece a steel tube 19, which, in cross section, has a rectangular shape, although that geometry is not necessary to the invention. On each side of approximately the lower two-thirds of the foot section 12 there are solid side plates 20 and 21. Rearwardly slanted struts 22 and 23 having forked ends are mounted on each side of a foot section 12 toward the front end of the side plates 20 and 21, respectively, and an hydraulic cylinder (not shown) will be attached to each of the struts and to the revolving frame 2 of the crane 1 to raise and lower the angle of the boom 8 to the revolving frame 2. In front of the side plates 20 and 21, an angle iron corner support 24 is mounted over each corner of the rectangular tube 19 extending from the side plates 20 and 21 to the top end of the foot section 12, and diagonal truss bars 25 form a lattice between the angle iron corner supports 24 on each side of the foot section 12. At the top end of the foot section 12, hanger plates 26 and 27 are welded one to each side of the tube 19 and a four wheel bogie 28 is mounted to and between the hanger plates 26 and 27 to provide a rolling support for the first intermediate section 13.

The structure of the first intermediate section 13 is very similar to that of the foot section 12, except that its dimensions are sufficiently small to permit it to telescope into and out of the foot section 12. The first intermediate section 13 also has as its main structure a steel tube 29 having a rectangular cross section. A pair of steel side plates 30 and 31 are welded to each side of the steel tube 29, at the lower end of the first intermediate section 13, and angle iron corner supports 32 are welded over each corner of the steel tube 29 throughout the entire length of the first intermediate section 13. At the top end of the first intermediate section 13 a pair of hanger plates 33 and 34 are welded one to each side of the end of the steel tube 29, and they mount a four wheel bogie 35 between them to provide a rolling support for the second intermediate section 14 which telescopes inside of the first intermediate section 13. From the top ends of the side plates 30 and 31 to the hanger plates 33 and 34 on each side of the steel tube 29, diagonal truss bars 36 are welded to the steel tube 29 and to the angle iron corner supports 32 to provide a lattice work between the angle iron supports 32.

As with the previously described boom sections 12 and 13, the second intermediate section 14 also has as its main single structural member a steel tube 37 with a rectangular cross section, and angle iron corner supports 38 are welded to the outside of each corner of the steel tube 37 throughout its entire length. The remainder of the external skeletal support for the second intermediate section 14 consists of side plates 39 and 40 welded to the steel tube 37 between the angle iron corner supports 38 at the lower end of the second intermediate section 14, a pair of hanger plates 41 welded to the sides of the top end of the steel tube 37 to mount a four wheel bogie 42 which rollingly supports the top section 15 in its telescopic movement in and out of the second intermediate section 14, and diagonal truss bars 43 welded to the steel tube 37 and to the angle iron corner supports 38 on each side of the second intermediate section 14 to form a lattice work between the side plates 39 and 40 on the lower end of the second intermediate section 14 and the hanger plates 41 on the top end.

The top section 15 of the boom 8 has, basically, five structural members, a steel tube 44 having a rectangular cross section and angle iron corner supports 45 welded to the outside of each corner of the steel tube 44. A pair of cheeks 46 are welded to the top end of the top section 15 to support the hoist sheaves 17 and 18 in the conventional manner.

The boom structure of this invention may be generally described as a central, hollow body portion, in the form of a steel tube (19, 29, 37 and 44) and an external supporting skeleton in the form of the angle iron corner supports (24, 32, 38 and 45) in each corner with diagonal struts (25, 36, and 43) forming a lattice between the angle iron corner supports on the sides, side plates (20 and 21, 30 and 31, and 39 and 40) between the angle iron corner supports at the lower end, and hanger plates (26 and 27, 33 and 34, and 41) on the sides of the tube at the top end. This structure provides an extremely strong boom which at the same time is very light in weight. Moreover, angle iron corner supports 24, 32, 38 and 45 in the lower corners of each section also provide tracks which ride on the four wheel bogies 28, 35 and 42 of the next adjacent larger section, so as to provide a sufficiently strong surface to support the boom 8 on the wheels of the bogies 28, 35 and 42 and to translate the weight of the boom 8 directly into the external skeletal supporting structure described.

The successive boom sections 13, 14 and 15 are telescoped into and out of the next adjacent lower section to contract and extend the boom 8, as is common in the art. The forces for telescoping the intermediate boom sections 13 and 14 in the first embodiment, and the top section 15 in subsequent embodiments are supplied by hydraulic cylinders. However, since the common generic term "hydraulic cylinder," which includes a cylinder, piston and piston rod, may be confused with that part of it called the "cylinder," this specification resorts to the less frequently used, though equally accepted generic term "hydraulic linear motor" or just "linear motor" to designate the hydraulic cylinder devices that telescope the boom.

In the embodiment shown in FIGS. 1 through 12, an external linear motor 201 is mounted beneath the boom 8 to telescope the first intermediate section 13 into and out of the foot section 12, and an internal linear motor 202 is mounted inside of the hollow boom 8 to telescope the second intermediate section 14 into and out of the first intermediate section 13. The top section 15 is telescoped into and out of the second intermediate section 14 manually, when the boom 8 is lowered. The force required to telescope the top section 15 may be supplied by raising or lowering the boom 8 slightly so that gravity will work in the desired direction on the top section 15.

An important aspect of the invention is the mounting of the linear motors 201 and 202. The external linear motor 201 has a cylinder 47 with a blind end 49 mounted beneath the lower end of the foot section 12 and a rod end 50 mounted beneath the top end of the foot section 12. The external linear motor 201 also has a piston rod 51, the end of which is fastened to the first intermediate boom section 13 beneath its top end by means of an eye 52 on the end of the piston rod 51 and a pin 53 through the eye 52 with its ends mounted in the hanger plates 33 and 34 at the top end of the first intermediate section 13. Trunnions 54 and 55 projecting laterally from the rod end 50 of the cylinder 47 of the external linear motor 201 are journalled in the hanger plates 26 and 27, respectively, of the foot section 12. The pin 53 and the trunnions 54 and 55 constitute the opposing supports against which the external linear motor 201 acts to telescope the intermediate section 13 into and out of the foot section 12.

The blind end 49 of the cylinder 47 of the external linear motor 201, therefore, merely requires support for its own weight. However, the weight of the blind end 49 that is actually exerted on its suspension will vary with the loading and extension of the boom 8 causing deflection of the boom 8. Therefore, a suspension for the blind end must exert a variable lifting force to correspond with the weight exerted on it, and as a convenient shorthand, such a suspension will hereinafter be referred to as a "resilient suspension." This resilient suspension is effected by means of a pair of automotive type shock absorbers 56 and 57, each of which contains a coil extension spring (not shown) to provide the resilient support and an hydraulic damper for damping oscillations. One of the shock absorbers 56 and 57 is mounted on each side of the foot section 12 in brackets 58 and 59, respectively, which are welded to the side plates 20 and 21 of the foot section 12. Pairs of connecting rods 60 and 61 mounted on sleeves 62 and 63, respectively, about the shock absorbers 56 and 57 are bolted to opposite ends of a flat bar 64, which is anchored to the blind end 49 of the cylinder 47 by means of strap 65. Thus, the blind end 49 of the cylinder 47 of the external linear motor 201 is suspended from the foot section 12, on shock absorbers 56 and 57 on each side of the foot section 12, to provide a dampened spring or resilient support.

When the boom 8 is retracted and horizontal, the maximum weight is exerted on the shock absorbers 56 and 57 by the blind end 49 of the external hydraulic cylinder 47, and the springs in the shock absorbers 56 and 57 exert the maximum upward force. When the boom 8 is extended and loaded, the blind end 49 of the external hydraulic cylinder 47 becomes lighter permitting the shock absorbers 56 and 57 to shorten and lift the blind end 49. Since boom extension and loading causes downward deflection of piston rod eye 52 and since the rod end 50 of external cylinder 47 pivots on trunnions 54 and 55, the uplift of the lightened blind end 49 tends to keep the assembly of cylinder 47 and rod 51 straight.

An alternative form of the resilient mounting of the blind end 49 of the cylinder 47 of the external linear motor 201 utilizing a single shock absorber is shown in FIGS. 9 and 10. In fact, for commercial applications this alternate embodiment is believed to be preferred. In that embodiment, a steel shelf 66 is mounted to project laterally from the bottom surface of the foot section 12 of the boom 8, and a C-shaped stop member 67 is bolted to the bottom of the shelf 66 to suspend beneath the shelf 66. An automotive shock absorber 68, which contains both a suspension spring and a hydraulic damper is mounted on top of the shelf 66 and a tubular sleeve 69, having connecting rods 70 projecting downward from each side, is fitted around a shock absorber 68. A heavy steel arm 71 is mounted on the blind end 49 of the cylinder 47 of the external linear motor 201 and projects laterally therefrom beneath the shelf 66. A steel plate 72 is mounted horizontally on the projecting end of the arm 71 so that the connecting rods 70 may be bolted to it and the bottom end of the C-shaped stop member 67 can hook underneath it. Thus, the C-shaped stop member 67 limits the downward movement of the blind end 49 of the cylinder 47 of the external linear motor 201, and it can support the blind end 49 to relieve the shock absorber 68 when the full weight of the blind end is exerted against the resilient suspension as for instance during high speed highway travel.

The cylinder 48 of the internal linear motor 202 also has a blind end 73, a rod end 74 and a piston rod 75. As can be seen in the drawing, the mounting of the internal linear motor 202 is the reverse of that of the external linear motor 201, in the sense that the blind end 73 of the cylinder 48 of the internal linear motor 202 is toward the top 16 of the boom 8 whereas the blind end of the cylinder 47 of the external linear motor 201 is toward the foot 11 of the boom 8. The end of the piston rod 75 of the internal linear motor 202 is mounted on trunnions 76 on the inside of the first intermediate section 13 towards the bottom end of that section 13, and the rod end 74 of the cylinder 48 of the internal linear motor 202 is mounted on trunnions 77 near the bottom end of the second intermediate section 14 of the boom 8.

The blind end 73 of the cylinder 48 of the internal linear motor 202 is inside of the top section 15 of the boom 8, but the top section 15 of the boom 8 must be free to telescope in and out of the second intermediate section 14, in which the internal hydraulic cylinder 48 is fixed. Therefore, a rolling resilient suspension for the blind end 73 of the cylinder 48 is needed. To achieve that, a tubular beam 78 having a rectangular cross section is mounted on the blind end 73 of the cylinder 48 to project axially therefrom. Portions of the top and bottom walls of the hollow beam 78 are cut away to accommodate a pivotally mounted shock absorber 79, which has one end mounted about a pin 80 inside of the beam 78 close to the blind end 73 of the cylinder 48, and the other end, which projects away from the blind end 73, is pin mounted to the top of a bell crank 81. A wheel 82 is rotatably mounted on the other end of the bell crank 81 and a pin 83 mounted through a downwardly projecting tongue 84 of the hollow beam 78 supports the fulcrum 85 of the bell crank 81. The bell crank 81 is actually made up of two triangular shaped plates of metal mounted side by side with the end of the shock absorber 79 and the wheel 82 between them, and both the shock absorber 79 and the bell crank 81 move within the two sides of the hollow square shaped beam 78. The wheel 82 rides on the floor of the interior of the top section 15 of the boom 8 as the top section 15 is telescoped in and out of the second intermediate section 14. A standard 86 with a resilient rubber foot 87 is welded to the hollow beam 78 for more rigidly supporting the blind end 73 of the cylinder 48 during highway travel.

When the boom 8 is contracted and has no load upon it, the carriage made up of the beam 78, shock absorber 79, bell crank 81 and associated structure, bears the maximum weight and rests in the position shown in solid lines in FIG. 11 on the standard 86. However, when the boom is loaded or extended or both so as to cause a deflection, the crank 81 pivots about its fulcrum 85 under the pressure of the shock absorber 79, lifting the blind end 73 of the cylinder 48 higher inside of the top section 15 of the boom 8 as is shown in broken lines in FIG. 11. As in the resilient mounting of the blind end 49 of the external cylinder 47, the requirement for lift force to be applied by the shock absorber 79 to the blind end 73 of the internal hydraulic cylinder 48 decreases and as the boom deflects the cylinder 48 is lifted with respect to the top section 15 of the boom 8.

This novel mounting of the hydraulic linear motors 201 and 202 for expanding and retracting the telescopic boom 8 achieves three fundamental advantages: first, stress on and deflection of the boom 8 is reduced as a result of the support given the boom 8 by the hydraulic linear motor 201; second, much lighter weight hydraulic linear motors 201 and 202 may be used; and third, the resilient suspension of the blind ends 49 and 73 of the cylinders 47 and 48, respectively, allows the cylinders 47 and 48 to align with the respective piston rods 51 and 75, thus avoiding damage to either as a result of boom deflection. Because the hydraulic linear motor 201 is mounted to act underneath the boom 8, part of the bending stresses exerted on the boom 8 are sustained as columnar forces on the linear motor 201—in other words, the linear motor 201 tends to push the free, top end of the boom 8 upward—so that stress on and deflection of the boom 8 is reduced. The prior art mounting of linear motors on the upper side of the boom, not only failed to minimize deflection, but actually accentuated it. Secondly, since columnar strength is inversely proportional to the square of the length of the column, and since the linear motors 201 and 202 are mounted so as to minimize their columnar lengths, much less structural strength is required in the linear motors 201 and 202. Thus, much lighter weight linear motors 201 and 202 may be used.

Also the weights of both of the linear motors 201 and 202 are sustained at the ends of the respective piston rods 51 and 75, and at the rod ends 50 and 74, and the blind ends 49 and 73 of the cylinders 47 and 48, respectively. Therefore, the piston rods 51 and 75 need only be large enough to support their own respective weights plus column load, the cylinders 47 and 48 need only be heavy enough to support their own weights plus tensile loads, and stress due to deflection on the packing at the rod end of the cylinders 47 and 48 is minimized. As a result, the linear motors 201 and 202 may be further lightened.

Additional embodiments of that aspect of the invention related to the mounting of the hydraulic linear motors, are shown in FIGS. 13 through 22. Since the aspect of the invention relating to the mounting of the hydraulic linear motors may be used with a telescopic boom of any structure, the structural details of the boom have been omitted in the drawings of these additional embodiments. However, if it facilitates an understanding of the invention, one may assume that the boom structure employing these embodiments is the same as that described in connection with the first embodiment. Insofar as boom structure is illustrated at all, the same reference numerals as were used for corresponding structure in the first embodiment are employed in the subsequent embodiments as well.

FIGS. 13 through 17 illustrate a second embodiment, and FIG. 18 shows a modification of that second embodiment. In FIG. 13 a foot end hydraulic linear motor 203 is shown mounted on one side of the boom 8 to telescope the first intermediate section 13 in and out of the foot section 12. In FIG. 14 it can be seen that an intermediate hydraulic linear motor 204 is mounted on the opposite side of the boom 8 from the foot end linear motor 203, to telescope the second intermediate section 14 into and out of the first intermediate section 13. The top section 15 may be manually telescoped in and out of the second intermediate section 14, or since the intermediate linear motor 204 is mounted outside of the boom, a third linear motor (not shown) could be mounted inside of the top section 15 and the second intermediate section 14 to telescope those sections 14 and 15. Such an arrangement is shown in the third embodiment which is described below, and hence no further reference is required here.

In the second embodiment as is shown in FIG. 13, the foot end linear motor 203 has a cylinder 88 with a rod end 90 mounted on trunnions 91, which are journalled in the wall of the foot section 12, and in a hanger 92, which is welded to and suspended from the wall of the foot section 12. The foot end linear motor 203 also has a piston rod 93 with an eye 94 on its external end, and the eye 94 is secured by a pin 95 to the top end of the first intermediate section 13, the pin 95 having one end fastened in the wall of the top end of the first intermediate section 13 and the other end mounted in an end of a hanger 96, which is welded to the top end of the first intermediate section 13. Opposite from the rod end 90 of the cylinder 88 is a blind end 97, and the blind end 97 is mounted to be resiliently supported by an automotive shock absorber 98 that contains a suspension spring and a hydraulic damper, and that is fastened to the foot end 12 of the boom 8.

The other side of the boom 8 is shown in FIG. 14. There it can be seen that the intermediate linear motor 204 has a cylinder 89 with a rod end 99 trunnion mounted between the top end of the first intermediate section 13 and a hanger 100 that is welded to the top end of the first intermediate section 13. The intermediate hydraulic linear motor 204 also has a piston rod 101 with an eye 102 on its external end, and the eye 102 is pinned to the top end of the second intermediate section 14 by a pin 103 that has one end mounted at an end of a hanger 104, which is welded to the top end of the second intermediate section 14, and that has its other end mounted in the wall of the top end of the intermediate section 14. A blind end 105 of the cylinder 89 of the intermediate linear motor 204 is also resiliently suspended on the boom 8, but since it must be movable with respect to the foot section 12 of the boom 8 to accommodate telescoping action of the first intermediate section 13 into and out of the foot section 12, a track 106 is mounted along the side of the foot section 12 of the boom 8, and a wheel 109 is trapped inside of the track 106 to roll back and forth parallel to the foot section 12 of the boom 8. The blind end 105 of the cylinder 89 rides on the wheel 109 supported by an automotive type shock absorber 110 which contains a suspension spring and a hydraulic damper to effect the resilient mounting described in connection with the previous embodiment. As an alternative to the mounting means shown, FIG. 17 illustrates a track 111 extending along the side of the foot section 12 of the boom 8 and containing a wheel 112, with an automotive shock absorber 113, containing a suspension spring and damper, mounted on the wheel 112 to suspend the blind end 105 of the cylinder 89 of the intermediate hydraulic linear motor 204 beneath the track 111.

FIGS. 18 through 22 illustrate a third embodiment of that aspect of the present invention relating to the mounting of hydraulic linear motors for telescoping a boom. In this third embodiment, there are two foot section hydraulic linear motors 205 and 206 mounted on opposite sides of the foot section 12 and the first intermediate section 13 of the boom 8. There is a single intermediate hydraulic linear motor 207 which is mounted beneath the boom 8, and there is a top section hydraulic linear motor 208 that is mounted inside of the top section 15 and the second intermediate section 14. The two foot section linear motors 205 and 206 telescope the first intermediate section 13 into and out of the foot section 12. The intermediate linear motor 207 telescopes the second intermediate section 14 into and out of the first intermediate section 13, and the top section linear motor 208 telescopes the top section 15 into and out of the second intermediate section 14. The foot section linear motors 205 and 206 have cylinders 114 and 115 with blind ends 118 and 119, respectively, which are resiliently mounted, and rod ends 120 and 121, which are trunnion mounted. The foot end linear motors 205 and 206 also have piston rods 122 and 123, respectively, with eyes 124 and 125, respectively, on their forward ends. In this regard, the structure of the intermediate linear motor 207 and the top section linear motor 208 are the same, for the intermediate linear motor 207 has a cylinder 116 with a blind end 126 and a rod end 127, and it has a piston rod 128 with an eye 129 on its external end. The top section linear motor 208 also has a cylinder 117 with a blind end 130, a rod end 131, and it has a piston rod 132 with an eye 133 on its external end. The blind ends 118 and 119 of the cylinders 114 and 115 of the foot section linear motors 205 and 206, respectively, are resiliently mounted on automotive type shock absorbers 134 and 135 containing suspension springs and dampers that are fastened to the foot section 12 of the boom 8. The rod ends 120 and 121 of the cylinders 114 and 115 of the foot section linear motors 205 and 206, respectively, are trunnion mounted in hangers 136 and 137 mounted on opposite sides of the top end of the foot section 12 of the boom 8. The eyes 124 and 125 on the piston rods 122 and 123 of the foot section linear motors 205 and 206, respectively, are pivotally mounted to the ends of hangers 138 and 139, respectively, which are welded to the top end of the first intermediate section 13 of the boom 8.

The top section linear motor 208 has the blind end 130 of its cylinder 117 supported by an automotive type shock absorber 143, containing a suspension spring and damper, which is mounted on the inside of the top end of the top section 15 of the boom 8. The rod end 131 of the cylinder 117 is trunnion mounted on the inside of the bottom end of the top section 15, and the eye 133 on the piston rod 132 of the top section linear motor 208 is pin mounted on the inside of the bottom end of the second intermediate section 14 of the boom 8.

In order to accommodate the telescoping action of the first intermediate section 13 into and out of the foot section 12, it is necessary that the blind end 126 of the cylinder 116 of the intermediate linear motor 207 be movably mounted with respect to the foot section 12. To accomplish that, a slot 141 is formed in the bottom of the foot section 12 and extends down the middle of the bottom of the foot section 12. A two wheel bogie 142 straddles the slot 141 and rides on the floor of the foot section 12 inside of the foot section 12. The two-wheel bogie 142 mounts an automotive type shock absorber 140 containing a suspension spring and a damper, from which the blind end 126 of the intermediate hydraulic cylinder 116 is suspended. Hanger plates 144 and 145 on the top end of the first intermediate section 13 extend downwardly to support the rod end 127 of the intermediate hydraulic cylinder 116 which is trunnion mounted between them. Similarly, hanger plates 146 and 147 on the top end of the second intermediate section 14 of the boom 8 extend downwardly to support the eye 129 on the external end of the piston rod 128 of the intermediate hydraulic linear motor 207.

Having described the structure of the second and third embodiments in light of the earlier description of the structure and operation of the first embodiment, the operation of the second and third embodiments become self-evident. In the second embodiment, the first intermediate section 13 is telescoped into and out of the foot section 12 of the boom 8 by extending and contracting the piston rod 93 into and out of the cylinder 88 of the foot end linear motor 203, and the second intermediate section 14 is telescoped into and out of the first intermediate section 13 by contracting the piston rod 101 into and out of the cylinder 89 of the intermediate linear motor 204. In the second embodiment, as the first intermediate section 13 telescopes into and out of the foot section 12, the blind end 105 of the cylinder 89 of the foot end linear motor 203 will ride up and down the side of the foot section 12 on the wheel 109 in the track 106 (or the wheel 112 in the track 111). In the third embodiment, the first intermediate section is telescoped into and out of the foot section 12 by simultaneously extending or retracting the piston rods 122 and 123 of the respective foot section linear motors 205 and 206. As the first intermediate section 13 is thus moving with respect to the foot section 12, the blind end 126 of the cylinder 116 of the intermediate linear motor 207, riding on the two-wheel bogie 142 inside of the foot section 12, also moves with respect to the foot section 12 by the same amount. The second intermediate section 14 is telescoped into and out of the first intermediate section 13 by retracting or extending the piston rod 128 of the intermediate linear motor 207, and as the second intermediate section 14 moves with respect to the first intermediate section 13, it carries with it the top section 15 and the top section linear motor 208. To telescope the top section 15 into and out of the second intermediate section 14, the piston rod 132 of the top section linear motor 208 is retracted or extended.

The three embodiments described here with the indicated variations have this much in common with respect to the mounting of the hydraulic cylinders: The blind end of each hydraulic cylinder is resiliently mounted so that the support applied will vary according to the weight exerted at the blind end, the rod end of each hydraulic cylinder is pivotally mounted so as to have at least limited rotation in the direction of deflection of the boom 8, and the external end of the rod is more or less rigidly and pivotably mounted. In all cases, the telescoping forces exerted by the various hydraulic cylinders are exerted between the rod ends of the cylinders and the ends of the piston rods, the blind ends of the various cylinders, therefore, not bearing any column forces. Hence, a portion of bending stress exerted on the boom 8 is resolved as columnar force against the hydraulic cylinders, thus decreasing the deflection and increasing the payload capacity of the boom.

Also, as a result of that mounting of the hydraulic cylinders, the weight of the hydraulic linear motors may be minimized. As has also been mentioned, the vulnerable parts of the hydraulic linear motors are protected against damage resulting from boom deflection by the resilient blind end mounting which helps cylinders and piston rods to remain in alignment. Thus, signal advantages are achieved by this unique mounting of the hydraulic linear motors utilized in telescoping a telescopic cantilevered boom. In addition to that, as was disclosed above, two further advantages are achieved by employing the boom structure described in detail in connection with the first embodiment.

The foregoing disclosure of numerous embodiments and variations of the present invention establishes beyond peradventure that the invention is not limited to any one, or even all, of the various embodiments shown here. By contrast, the invention itself, apart from the embodiments, is set forth in the claims that follow.

We claim:

1. In a cantilevered telescoping boom for a hydraulic crane, the combination comprising:
   a plurality of boom sections in telescoping relationship, one of said boom sections being a foot section of said boom and another of said boom sections being a first intermediate boom section positioned to telescope inside said foot section;
   a hydraulic linear motor for telescoping said first intermediate boom section and said foot section;
   said hydraulic linear motor having a cylinder with a rod end and a blind end, and having a piston rod extending axially out of said rod end of said cylinder;
   said hydraulic linear motor having said piston rod fastened to said first intermediate boom section and having said rod end of said cylinder pivotally fastened to said foot section to exert a telescoping force on said boom, said blind end of said cylinder of said hydraulic linear motor being suspended from a suspension spring and hydraulic damper mounted on said boom so that the lifting force on said blind end of said cylinder will vary from a maximum when said boom is contracted with no load to a minimum when said boom is extended with full load.

2. In a cantilevered telescoping boom for a hydraulic crane, the combination comprising:
   a plurality of boom sections in telescoping relationship, said boom sections being tubes having an external supporting skeleton and a polygonal cross section;

a hydraulic linear motor for telescoping one of said boom sections and its adjacent boom section;

said hydraulic linear motor having a cylinder with a rod end and a blind end, and having a piston rod extending axially out of said rod end of said cylinder;

said hydraulic linear motor having said piston rod fastened to one of said boom sections and having said rod end of said cylinder pivotally fastened to another of said boom sections to exert a telescoping force on said boom.

3. A cantilevered telescoping boom for a hydraulic crane as set forth in claim 2 wherein said external reinforcing skeleton includes an angle iron corner support extending along at least two bottom corners of said sections of said boom.

4. A cantilevered telescoping boom for a hydraulic crane as set forth in claim 3 wherein said cross section of said boom is rectangular and there in an angle iron corner support along each of the four corners of each section of said boom.

5. A boom section for a cantilevered telescoping boom comprising the combination of a metal tube having a polygonal cross section; and an external supporting skeleton for said section including angle iron corner supports fastened about the corners of said polygonal metal tube and extending at least a portion of the length of said tube and diagonal truss bars fastened to opposite sides of said tube between said angle iron corner supports to provide generally vertically oriented supporting lattices on each side of said tube.

6. In a cantilevered telescoping boom for a hydraulic crane, the combination comprising:

a plurality of boom sections in telescoping relationship, one boom section being a foot section of said boom, and another boom section positioned to telescope inside said foot section;

a hydraulic linear motor for telescoping one of said boom sections and its adjacent boom section, said hydraulic linear motor having a cylinder with a rod end, a blind end, having a piston rod extending axially out of said rod end of said cylinder, and being mounted beneath said boom;

said hydraulic linear motor having the end of said piston rod fastened to the top end of said first intermediate boom section and having said rod end of said cylinder trunnion mounted near the top end of said foot section to exert a telescoping force on said boom and the blind end of said hydraulic cylinder is resiliently suspended from beneath the back end of said foot section.

7. In a cantilevered telescoping boom for a hydraulic crane, the combination comprising:

a plurality of boom sections in telescoping relationship;

a hydraulic linear motor for telescoping one of said boom sections and its adjacent boom section, said hydraulic linear motor having a cylinder with a rod end and a blind end, and having a piston rod extending axially out of said rod end of said cylinder;

said hydraulic linear motor having said piston rod fastened to one of said boom sections and having said rod end of said cylinder pivotally fastened to another of said boom sections to exert a telescoping force on said boom to telescope a first intermediate section of said boom into and out of a foot section of said boom; and a second hydraulic linear motor for telescoping a second intermediate section of said boom into and out of said first intermediate section being mounted on said boom by having its piston rod fastened to said first intermediate section, a rod end of its cylinder operatively fastened to said second intermediate section, and a blind end of its cylinder resiliently supported by said boom.

8. A cantilevered telescoping boom as set forth in claim 7 wherein said second hydraulic linear motor is mounted inside said boom and has the blind end of its cylinder movably mounted on a resilient supporting means.

9. A cantilevered telescoping boom as set forth in claim 7 wherein said second hydraulic linear motor is mounted inside said boom and has its blind end supported on an automotive type shock absorber containing a suspension spring and a hydraulic damper which is mounted on a wheel riding on the bottom of the interior of a top section of said boom.

10. In a cantilevered telescoping boom for a hydraulic crane, the combination comprising:

a plurality of boom sections in telescoping relationship;

a first hydraulic linear motor mounted to one side of said boom for telescoping a first intermediate section of said boom in a foot section of said boom;

said first hydraulic linear motor having a cylinder with a rod end and a blind end, and having a piston rod extending axially out of said rod end of said cylinder;

said first hydraulic linear motor having said piston rod fastened to one of said boom sections and having said rod end of said cylinder pivotally fastened to another of said boom sections to exert a telescoping force on said boom;

a second linear motor mounted to one side of said boom for telescoping a second intermediate section of said boom in said first intermediate section;

said first linear hydraulic motor and said second linear hydraulic motor being mounted to opposite sides of said boom; and a third linear hydraulic motor mounted inside a top section of said boom which telescopes into said second intermediate section so that said blind end of said third hydraulic cylinder is resiliently supported inside the top end of said top boom section.

References Cited

UNITED STATES PATENTS

| | | | |
|---|---|---|---|
| 2,915,143 | 12/1959 | Simmons | 187—8.41 |
| 3,207,044 | 9/1965 | Hall | 212—55 |
| 3,243,052 | 3/1966 | Grove | 212—55 |
| 3,300,060 | 1/1967 | Lado | 212—55 |
| 3,308,967 | 3/1967 | Barkley | 212—55 |
| 3,315,821 | 4/1967 | Grove | 212—55 |
| 3,323,660 | 6/1967 | Allin | 212—144 |

FOREIGN PATENTS 996,853  6/1965  Great Britain.

RICHARD E. AEGERTER, *Primary Examiner.*

H. C. HORNSBY, *Assistant Examiner.*

U.S. Cl. X.R.

212—144

UNITED STATES PATENT OFFICE
CERTIFICATE OF CORRECTION

Patent No. 3,445,004             Dated May 20, 1969

Inventor(s) L. D. Grider, et al.

It is certified that error appears in the above-identified patent and that said Letters Patent are hereby corrected as shown below:

Column 1, Line 20,      for "to one boom section" read --to an adjacent boom section--

Column 1, Line 42,      for "ends" read --end--; for "hyraulic" read --hydraulic--; for "cyliners" read --cylinder--

Column 1, Line 51,      for "beig" read --being--

Column 1, Line 66,      for "is" read --it--

Column 3, Line 1,      for "environment" read --environmental--

Column 5, Line 29,      for "hereinafter" read --hereafter--

Claim 4, Line 18,      for "in" read --is--

SIGNED AND SEALED
MAR 10 1970

(SEAL)
Attest:

Edward M. Fletcher, Jr.
Attesting Officer

WILLIAM E. SCHUYLER, JR.
Commissioner of Patents